UNITED STATES PATENT OFFICE.

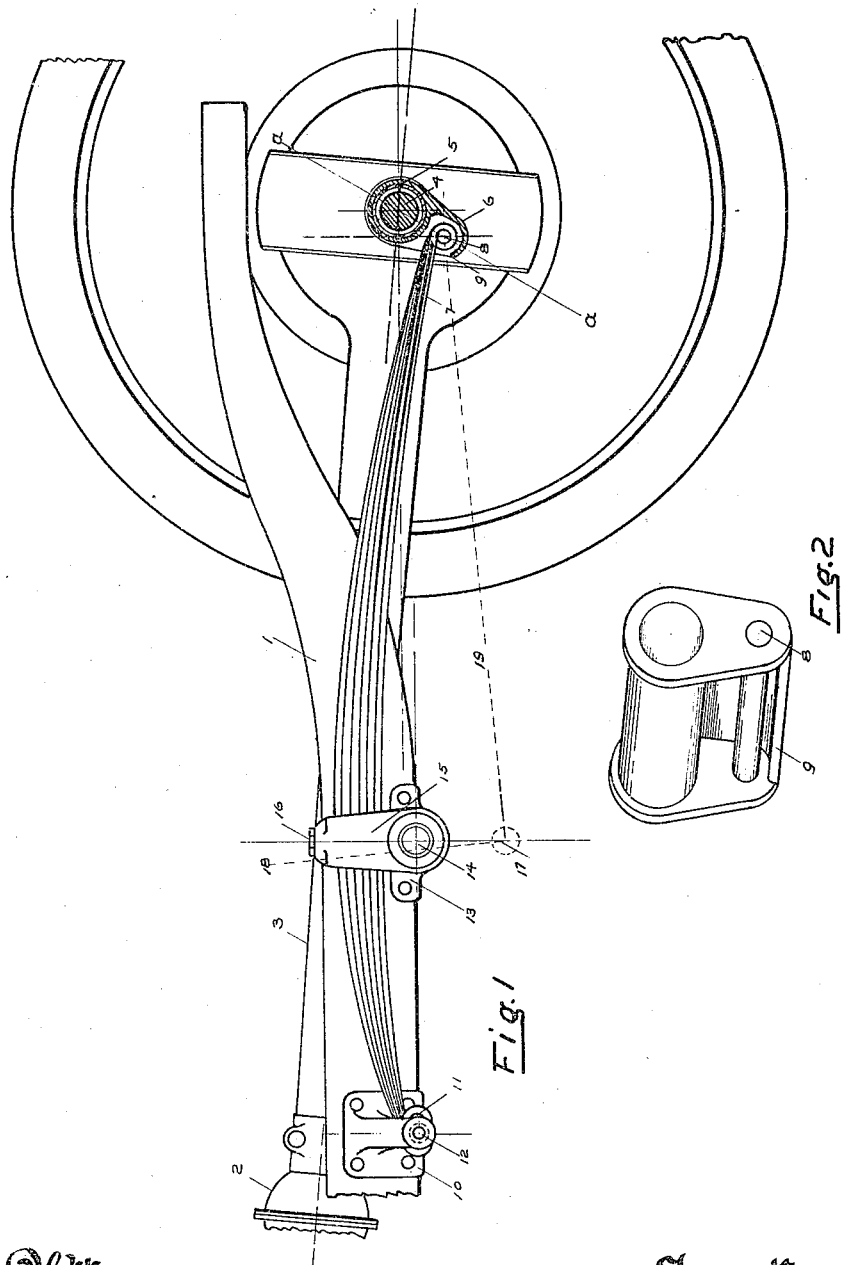

VICTOR LEE EMERSON, OF ALEXANDRIA, VIRGINIA, ASSIGNOR TO THE EMERSON ENGINEERING COMPANY, A CORPORATION OF DELAWARE.

SPRING SUSPENSION MECHANISM FOR AUTOMOBILES.

1,188,743. Specification of Letters Patent. Patented June 27, 1916.

Application filed November 17, 1914. Serial No. 872,548.

*To all whom it may concern:*

Be it known that I, VICTOR LEE EMERSON, a citizen of the United States, residing at No. 21 Rosemont avenue, Alexandria, and State of Virginia, have invented certain new and useful Improvements in Spring Suspension Mechanism for Automobiles, of which the following is a specification.

My invention relates to spring suspension mechanism for automobiles.

One of the objects of the same is to give the chassis free action vertically and prevent undue lateral motion and longitudinal strains on the rear axle, due to end thrust of springs. To so mount the spring, in relation to the rear axle, that the weight of the chassis causes a constant forward thrust of the rear axle and torque tube thereby causing the lost motion to be constantly taken up.

Another object is to provide a construction whereby the vehicle may be shoved by the torque tube and the rear axle held in alinement with the chassis laterally by the springs which resist the side thrust by connecting them with the chassis and axle in such a manner that a free longitudinal movement of the springs is had, together with resistance to lateral thrust.

Another object is to avoid the usual forward and aft motion of the spring at the axle and to cause the same to work in substantially a vertical line, so that the axle may, at all times, be thrust forward due to the weight of the body and chassis on the inclined hanger connection between the springs and rear axle.

Another object is to prevent the reversal of the spring hanger on the upward recoil of the spring.

Figure 1 is a side elevation of the chassis and spring mount, axle and torque tube.

Fig. 2 is a detail view of the rear spring hanger.

No. 1 is the chassis frame; 2 is the ball and socket joint for receiving the driving thrust; 3 is the torque tube; 4 is the rear axle; 5 is the rear axle housing; 6 is a spring hanger rotatably mounted on the axle housing 5; the spring 7 is pivotally mounted in the spring hanger 6 at the point 8; around the pivotal point is a curved part 9, which limits the rotative travel of the hanger 6 on the axle housing 5, by such a construction that on the recoil of the spring the part 9 will come in contact with the spring 7, thus preventing the reversal of the hanger.

It will be noted that the spring hanger is of a box-like form with a closed back which makes it rigid against side thrust. The upper end of the hanger is provided with a bore adapted to encircle the axle housing, and the lower end is provided with a pivot member 8, to receive the rear end of the spring, which pivot member is located in a position on the hanger in as close proximity to the center of the axle as working clearance will permit. This construction avoids the side thrusts acting through an extensive leverage, as is common in the well known form of link.

The forward support of the springs is comprised of a suitable forging 10, slotted so as to receive the end of the spring indicated at 11, at which end is formed an elongated slot working on a roller pin 12, so that the spring may have a free movement longitudinally and be substantially free from side play. A fitting 13 carrying a spindle 14 is attached rigidly to the chassis frame and a yoke 15 is pivoted on spindle 14, free to pivot thereon substantially without side motion. The upper end of the yoke 15 is provided with a large diameter set screw for the purpose of clamping the spring within the yoke, so that the movement of the spring controls the movement of the yoke on the pivot spindle No. 14. The pivotal points of suspension 8—12—14 are fixed in relation to each other in such a manner that they operate in as near a straight alinement as possible under service conditions. This construction results in a reduction of the movement at the pivots to a minimum and gives the spring the greatest resistance to side thrust, which avoids the rolling motion of the vehicle that is experienced with springs that have their pivotal points arranged out of alinement, as is the case where the spring has a large camber. The form of springs and mounting herein shown is preferable owing to keeping the rear hanger 6 in the desired relative position with respect to the rear axle. Other forms of springs and various means of attaching the same to the frame with or without pivots on the frame might be used in connection with the rear hanger herein shown.

When the chassis is depressed to the end of its travel the center of pivot 14 will be at the point 17 and the yoke will be thrown forward to the position indicated by the line 18. The line 18, it will be noted, meets the line 19, which extends between the pivots 14 and 8, at right angles. The spring 7 is thereby caused to move forward, owing to the arrangement of the point 14 in relation to the yoke in which the spring is mounted. The forward travel of the spring is substantially equal to the rearward extension of the spring toward the rear axle, due to the flattening of the spring ellipse, thereby maintaining the pivotal point 8 at a substantially constant angular position with the respect of the axle 4 as indicated by line a—a. The construction avoids an excessive longitudinal oscillatory movement which tends to wear the parts and shift the line of force, which causes undue strain on the axle and torque tube and throws the axle and wheels out of tracking alinement. By maintaining the angularity of the spring hanger in the forward position, as herein shown, a uniform pressure is exerted forwardly on the axle and torque tube, which keeps the ball and socket 2 in contact with its seat. The same condition obtains when other forms of thrust members are used. Thus the difficulties herein mentioned are overcome in the manner set forth.

What I claim is:

1. In an automobile provided with a frame, the combination of an axle, of means for maintaining the longitudinal position of said axle with respect to said frame, a spring attached to said frame so as to have longitudinal movement with respect thereto, a member pivotally connected with said axle and extending at an angle to the same, means for pivotally attaching said spring to said member, the points of attachment of said spring to said body and rotatable member being so placed with respect to said axle that the forward longitudinal motion of the spring will compensate for the rearward elongation thereof due to the flattening of the spring ellipse, whereby said rotatable member maintains its angularity with respect to said shaft.

2. In an automobile provided with a frame, the combination of an axle, of means for maintaining the longitudinal position of said axle with respect to said frame, a spring adapted to be attached to said frame and axle, a member for attaching said spring to said axle which member encircles the axle and has a restricted rotative movement thereon due to the contact of a portion of said member with said spring at a point in said movement, and means for pivotally attaching said spring to said member.

3. In an automobile provided with a frame, the combination of an axle, means for maintaining the longitudinal position of said axle with respect to said frame, a spring adapted to be attached to said frame, means encircling said axle and having a rotative movement thereon for attaching said spring to said axle, said means being so constructed as to limit the relative movement thereof with respect to said spring and axle by a portion of said encircling means coming in contact with the spring at a point in said relative movement.

4. In an automobile provided with a frame, the combination of an axle, means for maintaining the longitudinal position of said axle in respect to said frame, a spring adapted to be attached to said frame and axle, means for attaching said spring to said axle comprising a box-like member, an opening in said member through which the spring passes, the lower edge of said opening being so positioned with relation to said spring as to contact therewith in such a manner as to limit the relative movement of said member and spring.

5. In an automobile provided with a frame, the combination of an axle, means for maintaining the longitudinal position of said axle with respect to said frame, a spring adapted to be attached to said frame, pivoted means for attaching said spring to said axle and frame, said pivoted means being so positioned as to cause the load placed upon them to exert a constant force on the axle in a forward direction.

6. In an automobile provided with a frame, the combination of an axle, means for maintaining the longitudinal position of said axle with respect to said frame, a spring adapted to be attached to said frame, an axle, a member encircling and rotatable upon said axle, pivoted means for attaching said spring to said member and frame, means for maintaining a pivotal point of said spring with said member forward of the point of attachment of said member with said axle, whereby the constant force is exerted on the axle in a forward direction.

7. In an automobile provided with a frame, the combination of a driving axle, means for maintaining the longitudinal position of said axle with respect to said frame, comprising a torque tube pivotally attached to the frame at the forward end thereof, through which both torque and thrust are transmitted and through which a propeller shaft passes, a spring attached to said frame and axle forward of said axle, the rear end of said spring being pivoted forward and below said axle to a hanger attached to said axle, the pivotal point of said spring on said hanger being forward of an arc passing through the center of the axle and having a center at the point of attachment of said spring to said frame, so that the load on said spring produces a forward pressure on the pivot of the torque tube with the frame.

8. In an automobile provided with a frame, the combination of a driving axle, a torque tube for maintaining the longitudinal position of said axle with respect to said frame having a pivoted connection with said frame, a spring adapted to be connected with said frame and axle, said spring being attached to said axle by a hanging member, means for maintaining said hanging member at such an angle as to cause the load carried by it to exert a constant force in a forward direction on the axle and pivotal connection of said torque tube with said frame.

9. In an automobile provided with a frame, the combination of a driving axle, means for maintaining the longitudinal position of said axle with respect to said frame having a pivoted connection with the frame on the forward end thereof, a spring adapted to be connected to said frame and axle, a hanging member interposed in the connections of said spring between said frame and axle, means for maintaining said hanging member at such an angle as to cause load carried thereby to exert a constant forward force on said axle.

In testimony whereof I affix my signature in presence of two witnesses.

VICTOR LEE EMERSON.

Witnesses:
  F. L. SLAYMAKER,
  ANNETTE E. EMERSON.